United States Patent Office 3,331,747
Patented July 18, 1967

3,331,747
INTEGRATED NUCLEAR REACTOR-STEAM GENERATOR
Malcolm Richard Williamson, Slough, England, assignor to United Kingdom Atomic Energy Authority, London, England
Filed June 29, 1965, Ser. No. 468,038
Claims priority, application Great Britain, June 29, 1964, 26,823/64
4 Claims. (Cl. 176—54)

This invention relates to vapour generators and it is to be understood that where, herein, the words "water" and "steam" are used, they are intended to denote any liquid and its vapour unless the context requires otherwise.

More specifically the invention is concerned with so-called integrated nuclear reactor-steam generator systems in which the heating surface is housed in the same vessel as the reactor core so as to be heated by the primary coolant therefrom. Such systems have the advantage over systems in which the steam generator is outside the reactor vessel of compactness and saving of pipework and are, therefore, of particular interest in marine applications.

In accordance with the present invention there is provided an integrated nuclear reactor-steam generator system in which the heating surfaces are positioned in a chamber in the upper part of the vessel, the outer wall of which chamber is defined by a trunk closed at its upper end defining with the vessel a downcomer for the primary coolant, and the heating surfaces comprising steam generating tubes suspended from and removable with the lid of the vessel and either the trunk or an upper part of it, a sealed joint being provided between the trunk and the reactor shielding or the upper part and the rest of the trunk.

In a preferred form of the invention, the steam generating parts are located within a cylindrical trunk which is fixed to the reactor core (or its shield) and defines with the vessel an annular downcomer through which the primary coolant after it has passed the steam generator tubes is re-circulated to the core. The upper part of the trunk is removed with the steam generating parts and the joint is provided between the upper part and the rest of the trunk which joint is automatically made and un-made as the lid of the vessel is placed in position and removed therefrom. The rest of the trunk serves as a guide when the lid and the parts depending from it are lowered into position on and into the vessel.

The heating surfaces may be in the form of modules of straight tubes forming banks which are not rigid and which could be damaged by distortion during the lowering into the vessel. It is, therefore, a preferred feature of the invention to enclose the banks of tubes, be they in the form of modules or in any other form, in a casing which depends from the upper part of the trunk.

Figure 1:
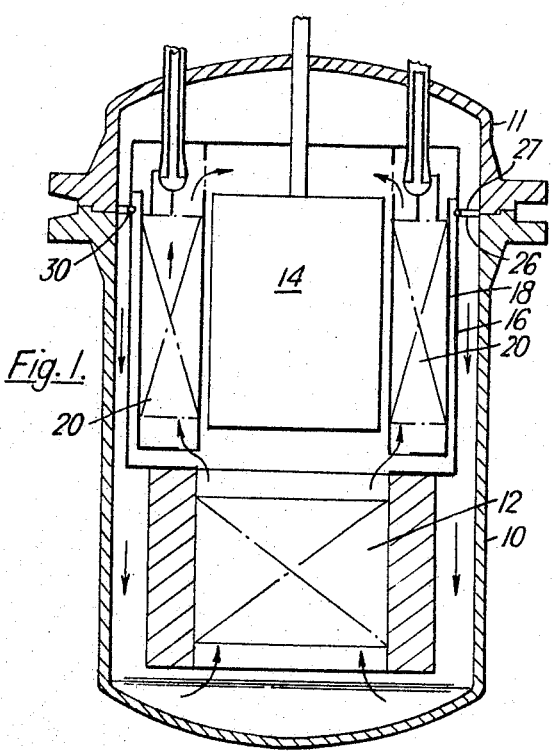
Figure 2:
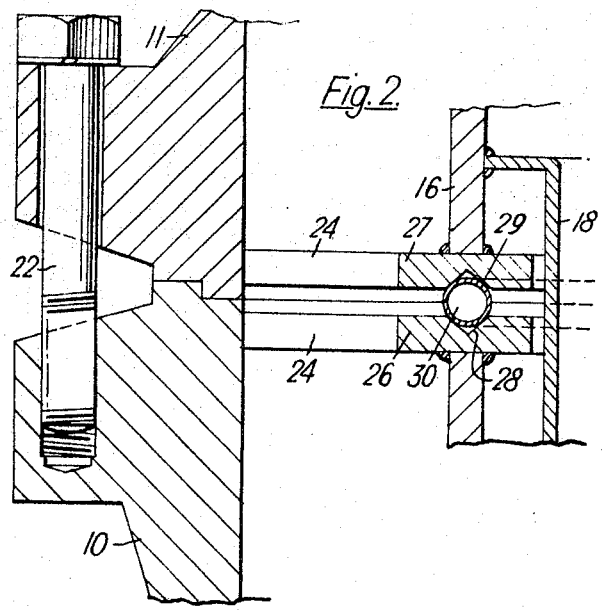

An integrated nuclear reactor/steam generator system in accordance with the invention will now be described by way of example, with reference to the accompanying diagrammatic drawing, in which:

FIGURE 1 is a sectional elevation of the system; and
FIGURE 2 is an enlarged view of a joint provided therein.

The system shown comprises a vertical cylindrical vessel 10 having a removable lid 11 and housing at the lower end a shielded reactor core 12. Extending upwards from the core, there is an outer cylindrical trunk 16 closed at its upper end and containing an inner cylindrical trunk 14 closed at both ends. Control rods (not shown) for the core pass through the trunk 14 which also contains other control gear.

Within the trunk 16 and suspended from its upper end there is a cylindrical casing 18 of annular shape closely surrounding the trunk 14. Within the casing 18 are disposed tube banks 20 providing the heating surface of the steam generator and these are shown completely diagrammatically. Examples of particular forms of tube banks and of their connection to inlet and outlet headers are to be found in co-pending applications Ser. Nos. 468,037, 468,039 and 468,063 all filed of even date and of common assignee.

Beneath the point of connection of the casing 18 to the trunk 16, the latter is circumferentially divided, its upper and lower parts being seated one on the other so as to maintain a seal as will be described with reference to FIGURE 2.

The vessel 10 and its lid 11 are, as is usual, flanged and held together by means of bolts 22.

As shown in FIGURE 2, the vessel and the lid each have a series of radial arms 24 which, at their inner ends, support rings 26 and 27, respectively, provided in their opposite faces with triangular grooves 28 and 29, respectively, in which is located a sealing gasket 30 in the form of an O-ring. The upper and lower parts of the trunk 16 are welded to the rings 27 and 26, respectively, and the casing 18 is welded to the trunk above the ring 27.

It will be readily seen that on removal of the lid, the upper part of the trunk 16 will come away with it as will all the steam generating parts. On replacement of the lid, the joint provided by the gasket 30 will be automatically made and be tightened when the lid and the vessel are bolted together.

The enclosing of the tube banks in the casing 18 is of particular advantages when these are made up of depending straight tubes or modules of tubes as shown, for example in the aforementional applications Ser. Nos. 468,-039 and 468,063 as they are protected against distortion or other damage during removal from and particularly during insertion into the vessel.

The division of the trunk 16 into upper and lower parts also has the advantage that the lower part which is fixed to the core provides a guide for the tube assembly when the steam generator unit is being inserted into the vessel.

The location of the division of the trunk at substantially the level of the top of the vessel has the advantage of facilitating inspection of the joint and that of providing a guide surface of substantial length. Also it allows the rings 26 and 27 and grooves 28 and 29 to be accurately machined and aligned so as to ensure a good seal when they are fitted together.

A gas filled metallic O-ring is the preferred form of gasket but other elastically compressible gaskets, which are resistant to the relatively high temperatures encountered in systems of this kind, can be used.

What is claimed is:
1. An integrated nuclear reactor-steam generator system of the type wherein heating surfaces at which the steam is generated are housed in common with a core of the reactor in a lidded vessel and are heated by a primary coolant passed through the core, said system comprising steam generating tubes constituting the heating surfaces at which the steam is generated and suspended from the vessel lid to be removable therewith, a trunk disposed internally of the vessel to surround the steam generating tubes and thereby separate primary coolant flow over the tubes from a primary coolant return flowpath defined between the trunk and walls of the vessel, a trunk closure also carried by the lid to close the upper end of the trunk, and a sealing means interposed between the trunk and the trunk closure.

2. A system according to claim 1, wherein a casing depending from the upper part of the trunk provides between the trunk and the steam generating tubes an interlayer to protect the tubes during removal and insertion.

3. A system according to claim 1, wherein the sealing means is interposed between respective flange members of the trunk and trunk closure.

4. A system according to claim 3, wherein the sealing means is an O-ring sealed disposed in respective annular grooves in the flange members.

References Cited

UNITED STATES PATENTS

| 3,012,547 | 12/1961 | Ostergaard et al. | |
| 3,163,585 | 12/1964 | Metcalfe et al. | 176—65 X |
| 3,184,391 | 5/1965 | Hackney | 176—61 X |

REUBEN EPSTEIN, *Primary Examiner.*